(12) United States Patent
Lorenz et al.

(10) Patent No.: US 9,557,803 B2
(45) Date of Patent: Jan. 31, 2017

(54) METHOD AND DEVICE FOR STORING AN ITEM OF WAKE-UP INFORMATION IN USERS OF A CAN BUS SYSTEM

(75) Inventors: Tobias Lorenz, Stuttgart (DE); Karsten Wehefritz, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 166 days.

(21) Appl. No.: 14/233,945

(22) PCT Filed: Jul. 12, 2012

(86) PCT No.: PCT/EP2012/063657
§ 371 (c)(1),
(2), (4) Date: Apr. 17, 2014

(87) PCT Pub. No.: WO2013/010900
PCT Pub. Date: Jan. 24, 2013

(65) Prior Publication Data
US 2014/0245052 A1 Aug. 28, 2014

(30) Foreign Application Priority Data

Jul. 19, 2011 (DE) .......................... 10 2011 079 412

(51) Int. Cl.
*G06F 1/32* (2006.01)
*H04L 12/40* (2006.01)
(52) U.S. Cl.
CPC ....... *G06F 1/3287* (2013.01); *H04L 12/40013* (2013.01); *H04L 12/40039* (2013.01); *H04L 2012/40215* (2013.01)

(58) Field of Classification Search
None
See application file for complete search history.

(56) References Cited

U.S. PATENT DOCUMENTS

| 6,728,892 B1 * | 4/2004 | Silvkoff | H04L 47/30 |
| | | | 713/320 |
| 2007/0230484 A1 * | 10/2007 | Hu | H04L 12/40039 |
| | | | 370/401 |

(Continued)

FOREIGN PATENT DOCUMENTS

| DE | 102 25 578 | 12/2003 |
| EP | 2 339 778 | 6/2011 |

(Continued)

*Primary Examiner* — Paul Yanchus, III
(74) *Attorney, Agent, or Firm* — Norton Rose Fulbright US LLP; Gerard Messina

(57) ABSTRACT

A device for connecting a user station to a CAN bus, the user station in the active state being able to exchange messages with other user stations via the CAN bus using the device, according to the standard ISO 11898; the user station in the at-rest state being able to be activated using the device, in response to the reception of a wake-up information; the wake-up information configured as a CAN message according to the standard ISO 11898; in the device, a suitable first arrangement selectively evaluating the wake-up information received, so that the wake-up process is initiated only in response to the presence of wake-up information that is specified or specifiable for the respective user station which is characterized in that a storage arrangement is provided in the device in order, in case the wake-up process is initiated, which store the wake-up information evaluated for this entirely or partially.

20 Claims, 2 Drawing Sheets

(56) References Cited

U.S. PATENT DOCUMENTS

2009/0213915 A1* 8/2009 Wagner .................. H04L 12/12
375/220
2010/0127857 A1* 5/2010 Kilmurray ............ G06F 1/3212
340/540

FOREIGN PATENT DOCUMENTS

EP          2 339 789       6/2011
WO          01/20434        3/2001

* cited by examiner

METHOD AND DEVICE FOR STORING AN ITEM OF WAKE-UP INFORMATION IN USERS OF A CAN BUS SYSTEM

FIELD OF THE INVENTION

The present invention is based on a method and a device for waking users of a CAN bus system.

BACKGROUND INFORMATION

For example, the ISO standard family 11898-1 through -5 describes the Controller Area Network (CAN) as well as an extension of the CAN designated as "time-triggered CAN" (TTCAN). The media access control method used in the CAN is based on a bit-wise arbitration. The user stations are simultaneously able to begin transmitting a message over the bus. The messages sent have an identification which is transmitted after a single "start of frame" bit. In the bit-wise arbitration, while sending the bits belonging to the identification, are simultaneously able to ascertain the logical state (0 or 1) of the bus. If the value of a bit sent by a first user station does not correspond to the ascertained logical state of the bus, another user station has obviously sent a message having a higher priority, and the first user station therefore ends its send access to the bus. The bit-wise arbitration thus achieves a non-destructive transmission of that message via the bus that wins the arbitration process.

With the increasing electronization of modern vehicles, and the advent of additional systems for the improvement of driving safety, for example, or driver convenience, the requirements with respect to the consumption of electric power are growing constantly. At the same time, the necessity exists of limiting the power usage, in order to take into account ecological and legal requirements. Even against the background of the increased introduction of electrically driven vehicles, it is indicated that power usage by control and regulating systems and safety and convenience systems should be kept within limits, since the electric power used has a direct effect on the vehicle's distance range.

For that reason, it is provided in new vehicles that one should put individual bus users or groups of bus users completely or partially at rest if the function exerted by them or the respective subfunctionality is not required. Along with that comes the requirement to wake up again or to activate bus users that are at rest, wholly or partially, when the function or the subfunctionality that is at rest is required again.

In this connection, German Patent Application DE 103 58 584 A1 discusses a device and a method for selectively waking up users of a bus system, in which a detecting arrangement, particularly a counter, is provided which detects at least one predefined signal property of the signals transmitted on the bus system and initiates the further wake-up procedure once a specifiable number has been reached.

Patent Application DE 102 25 578 A1 discusses a method and a device for the selective activation of bus users, which is distinguished by providing a separate voltage regulator for the protocol controller present in the bus user. Because of that, when bus communication takes place, the protocol controller may first be awakened without the associated application controller, the former then being available for comparing the messages present on the bus to one or more previously stored reference messages. If there is agreement, the application controller and with that, the entire bus user is awakened.

In the devices from the related art, after the waking process has taken place, the information as to by which signal or which message the waking process was triggered, is no longer present. This may be of disadvantage, particularly if different messages are supposed to lead to different properties of the awakened bus users. For example, if different waking messages for waking different subfunctionalities are to be drawn upon, the related art then does not supply satisfying results in every respect, since after the waking process has taken place, no information is available on the content of the message that has led to the waking up. If it were present, this information could be used to adjust the waking process depending on the reason for the waking, that is, depending on the requested functionality.

SUMMARY OF THE INVENTION

The present invention is therefore based on an object of providing a possibility, after a wake-up process has taken place, of continuing to provide the content of the successful wake-up information. This object is attained by the device and the associated method according to the independent claims.

In the following, the present invention and its advantages will be described with reference to drawings and exemplary embodiments. Advantageous developments are described by the dependent claims. The subject matter of the present invention is not limited to the represented and described exemplary embodiments.

In one advantageous application case, the door control device in a motor vehicle could contribute a subfunction to various vehicle functionalities, such as to the functionality of central locking of the operation of the door lock, for certain safety functionalities an automatic locking of the window, or, for convenience functionalities, a certain rearview mirror adjustment, such as automatically folding it away. Different ones of these functionalities are activated depending on the current status of the vehicle. The central locking could be turned off, for example, above a certain limit speed, or a safety functionality could first be activated above a speed threshold. A convenience functionality, such as the folding away of the rearview mirror could be made executable only at a standstill. Accordingly, depending on the vehicle state, different subfunctions or contributions of the door control device are required, and under suitable circumstances, the door control device may be put completely into an at-rest state. When waking up the door control device, it is meaningful to be able to activate subfunctions separately. For this purpose, it is advantageous if the information is present at the door control device as to by which wake-up message or for which functionality the waking process was carried out.

A further example is parking systems whose functionalities have to be provided in different ways, as a function of the vehicle state. For example, the sensors and the evaluation unit are usually completely activated when shifting into reverse takes place. In normal driving operation, on the other hand, the sensors are possibly not needed at all or only partly, depending on the speed, perhaps for measuring a parking space or for monitoring the blind spot, and the evaluation control unit has to carry out deviating or restricted functionalities. Here too, it may therefore be useful to be able to activate subfunctions of the parking system separately, starting from the at-rest state. Again, for this purpose, it is advantageous if the information is present at the parking control device as to by which wake-up message or for which functionality the waking process was carried out.

Additional advantageous possibilities of use of the device, according to the present invention, in the vehicle are also conceivable.

Starting from a method and a device for waking up users of a CAN bus system from the related art, in which a suitable first arrangement is provided for selectively evaluating the wake-up information received, and in which the wake-up process is initiated only if the wake-up information that is specified or specifiable for the respective user station is present, it is advantageous in the case of the device, according to the present invention, that a storage arrangement is provided so that, in the case in which the wake-up process is initiated, the wake-up information evaluated for this may be stored.

It is also of advantage that, in the device, a suitable further arrangement is provided so that, as a function of the stored wake-up information, different subfunctionalities of the user station and/or different application controllers and/or different operating modes of the at least one application controller are activated.

These additional arrangement(s) may be configured so that at least one application controller of the user station has provided to it reading access to the stored wake-up information. Thereby one may achieve rapid availability of the wake-up information to the application controller. In another specific embodiment, the additional arrangement(s) may also be configured so that the stored wake-up information is supplied to the communication controller. Thereby the wake-up information reaches that application controller delayed in time, as a normal bus message, which reduces the expenditure for establishing the method in the application controller.

In the case mentioned last, the further arrangement includes at least one coder for converting the stored wake-up information to a serial input signal for the communication controller. A changeover switch for changing over the input signal for the communication controller between the signal present on the bus and the serial signal generated by the coder is of advantage, in order to avoid collisions between incoming bus signals and the wake-up information provided by the coder at the input to the communication controller.

The first arrangement that is provided selectively to evaluate the wake-up information received, advantageously include a decoder which enters the serial message in a receiving storage area, the receiving storage area, a filter storage unit and a comparator unit. In this way, a rapid and reliable comparison is made possible of the message received with the entries of the filter storage unit.

The present invention will now be described in greater detail on the basis of the figures.

DETAILED DESCRIPTION

Figure 1:
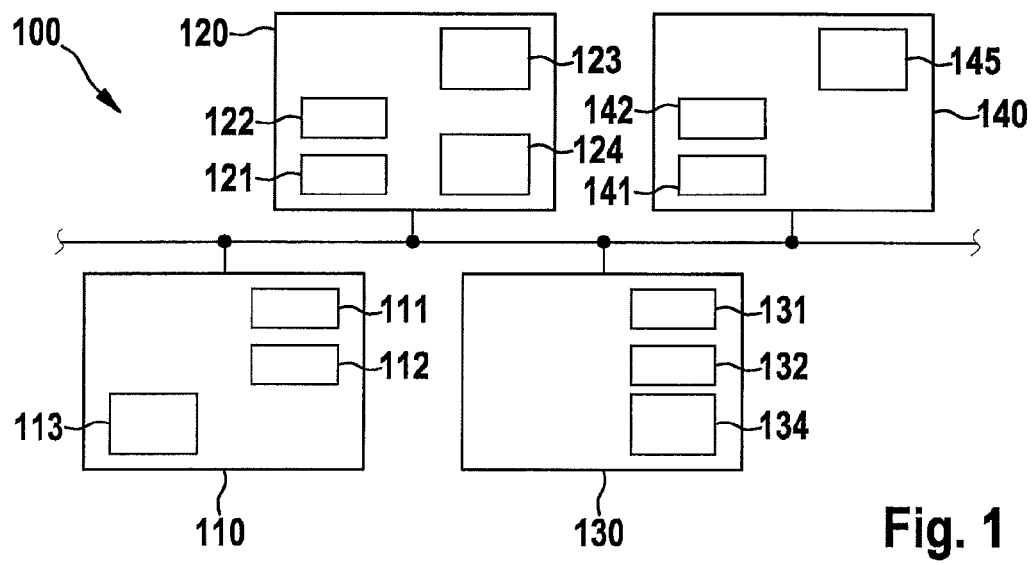
FIG. 1 schematically shows a bus system having bus users, who have the device according to the present invention.

FIG. 1 shows a bus system 100 having four bus users 110, 120, 130, 140. Each bus user has a device 111, 121, 131, 141, by which he is connected to the bus line. The device is connected to a communication controller, designated by 112, 122, 132, 142. In addition, the various bus users have application controllers that are designated by 113, 123, 124, 134, and 145. The application controllers are configured, in this example, to carry out one or more functions, and belong to one or more subnetworks. In this connection, each subnetwork is used to provide a certain functionality in the vehicle assembly.

Application controller 113 and 123, in the example shown here, together supply functionality A, application controllers 124 and 134 together supply functionality B and application controller 145 supplies alternatively function C or D. In another specific embodiment, an application controller could naturally also contribute to a plurality of functionalities.

The advantage of the present invention may be illustrated using bus user 120 as an example. If it is assumed that, under certain circumstances, functionalities A and B would not be needed, the bus user may be switched off in these driving situations or put in an at-rest state, since he is not needed. Now, if a situation occurs in which functionality A is required, one of the active users, for instance, user 110, sends out a wake-up message. Bus user 120 is in an at-rest state. His bus-connecting unit 121, which represents the device according to the present invention, observes in the at-rest state the message traffic on the bus. It analyzes the wake-up message received and determines that a wake-up message relevant to bus user 120 is involved. Accordingly, it activates communication controller 122 and one or more application controllers. Moreover, it provides the content of the wake-up message received in a memory area provided for this. Because the wake-up information is available in the bus user, selectively only application controller 123, which is required for carrying out functionality A, is able to be awakened, while application controller 124 remains in the at-rest state.

A further possibility of using the device according to the present invention may be shown on the example of bus user 140: as was shown before, application controller 145 is able to carry out alternatively functionality C or D. Starting from a situation in which neither of the two functionalities is required, bus user 140 is in an at-rest state. Now, if a situation arises in which functionality C is required, a bus user sends out a corresponding wake-up message, which is evaluated by device 141 in bus user 140 according to the present invention, and is stored in a suitable memory area, according to the present invention. Application controller 145 is started and is now able to evaluate or read in the wake-up information stored, and take up associated functionality C. If functionality D is requested, a deviating wake-up message is sent out and stored according to the present invention. Application controller 145 evaluates stored wake-up information or it is supplied to it by device 141, according to the present invention, and as result it takes over deviating functionality D.

Figure 2:
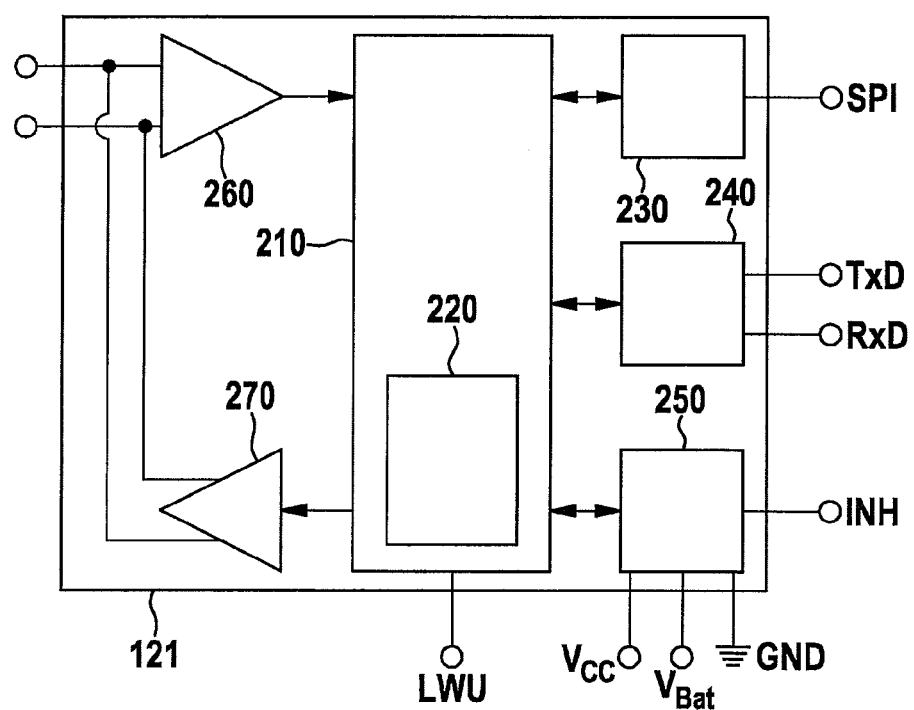
FIG. 2 shows a simplified block diagram of a device according to the present invention.

FIG. 2 represents a simplified block diagram of an exemplary embodiment of device 121 of the present invention. It includes as core part a control unit 210, which includes wake-up unit 220. Control unit 210 is connected to three interface units 230, 240 and 250, these, in the present example, each representing interfaces to an application controller, to a communication controller and to a voltage regulator. The associated terminals are designated, for example, by SPI, TxD, RxD and INH. One or more of these interface units may also be provided several times in other specific embodiments if, for example, a plurality of application controllers are in connection with control unit 210 or wake-up unit 220. Furthermore, control unit 210 is connected to reception unit 260, as well as to sending unit 270. These, in turn, are connected to the bus lines of bus system 100. Finally, the control unit still has one local wake-up terminal designated as LWU.

In normal operating mode, device 121 receives bus signals via reception unit 260 and passes these on via interface unit 240 and line RxD serially to the communication controller. In the sending case, the device receives on line RxD serial signals from the communication controller and transmits these via sending unit 270 to the bus lines. In the at-rest state of the bus user, for example, only reception unit 260 and control unit 210 are active with wake-up unit 220. Waking up the bus user is possible by various waking signals: the bus user may be activated, for instance, by the local waking terminal. Waking up by a bus message is of interest for the present invention. If a message is received in the at-rest state, it is passed on via reception unit 260 to wake-up unit 220, is decoded there and stored, in its entirety or partially, and is compared to one or more specified wake-up messages. In the case of agreement, the bus user is awakened through interface unit 250 and the INH terminal, which is in connection with a suitable arrangement, such as a voltage regulator.

Because the wake-up information has been stored and is available to the bus user, the wake-up process may be made a function of the content of the wake-up information. Thus, different application controllers may be activated as a function of the wake-up information, for example, or different functions may be carried out by the application controller. This may possibly be implemented in that, via interface unit 250, two voltage regulators are actuated which wake up two application controllers by supplying them with voltage. Alternatively, two interface units may also be provided for this. Each of the application controllers, during the wake-up process or after its end, scans the content of the memory area which includes the wake-up information.

If different application controllers are to be activated as a function of the wake-up information, in the case of agreement, the active state is maintained, while in the case of non-agreement the respective application controller takes on an at-rest state again, by outputting, for instance, a command for reducing the supply voltage via a suitable interface to the appropriate voltage regulator. If different functions are to be activated as a function of the wake-up information on the application controller(s), as a contribution to certain vehicle functionalities, the active state of all application controllers is maintained, but different programs are executed by the one or the plurality of application controllers as a function of the content of the storage area that includes the wake-up information.

Figure 3:
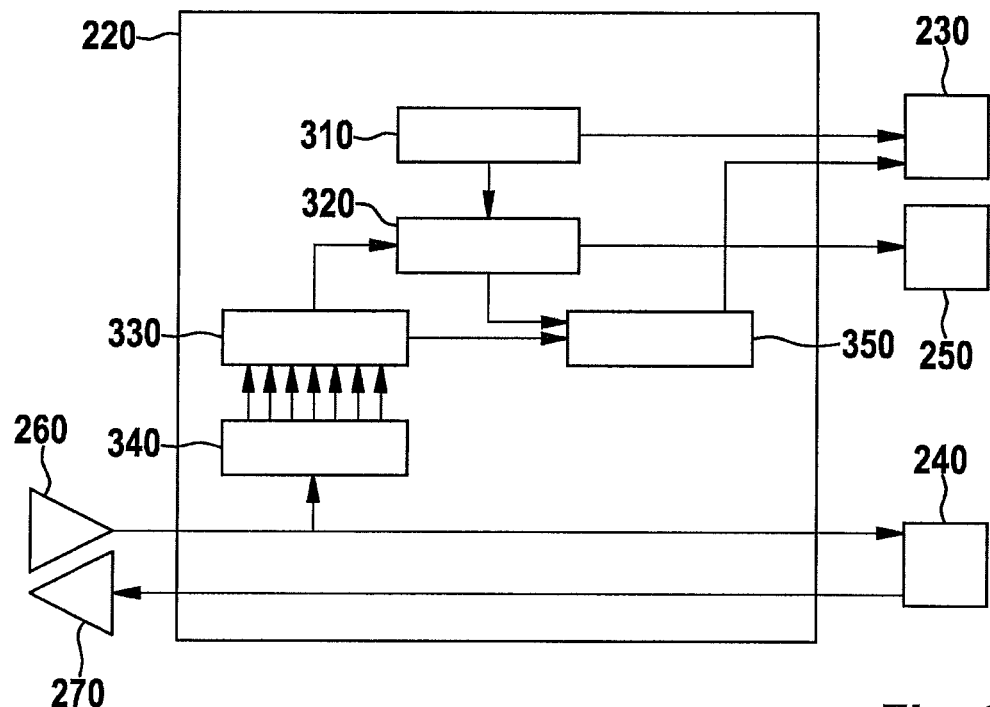
FIG. 3 shows a second exemplary embodiment of the wake-up message memory, which is an essential element of the present invention.

FIG. 3 shows an exemplary embodiment for the schematic configuration of wake-up unit 220, which includes an arrangement for the storage, according to the present invention, of the wake-up information. The wake-up message received serially by reception unit 260 is decoded in a decoding unit 340 provided for this, and is filed in reception storage area 330. One might also want to file only parts of the wake-up message, to the extent that these parts include the components required for the evaluation and restoration of the wake-up information. Filter storage area 310 includes filtering data which include, for example, the possible specifiable wake-up messages or the relevant components. In comparator unit 320 arranged for this, the message received in reception storage area 330 is compared to the filtering data from filter storage area 310. When the result is positive, that is, when the message received is one of the specified wake-up messages, the wake-up process takes place on the one hand, for example, the activation of the voltage regulator via interface 250. On the other hand, the wake-up message recognized as valid, that is present entirely or partially in reception storage area 330, is transmitted into wake-up information storage area 350 that is provided for this purpose. In the embodiment variant shown, the application controller has direct access to wake-up information memory area 350 via interface 230. Thus, the wake-up information is able to be read out and evaluated by the application controller. In this way, the application controller gets information on the wake-up information that has led to a wake-up, and is able to perform corresponding reactions, for instance, activate established subfunctions and/or wake up other application controllers and/or take up again an at-rest state itself.

By contrast, the reading out of reception storage area 330 by the application controller, in order to obtain information on wake-up information that has led to a waking-up has the disadvantage that reception storage area 330 is able to be overwritten by subsequently received messages that represent no wake-up messages relevant to the bus user. By the transfer of the wake-up information to wake-up information storage area 350 after successful checking by comparator unit 320, in contrast to this, the advantageous effect is achieved that the message, which has led to the wake-up of the bus user, is still available to the application controller, even after the arrival of further messages.

Figure 4:
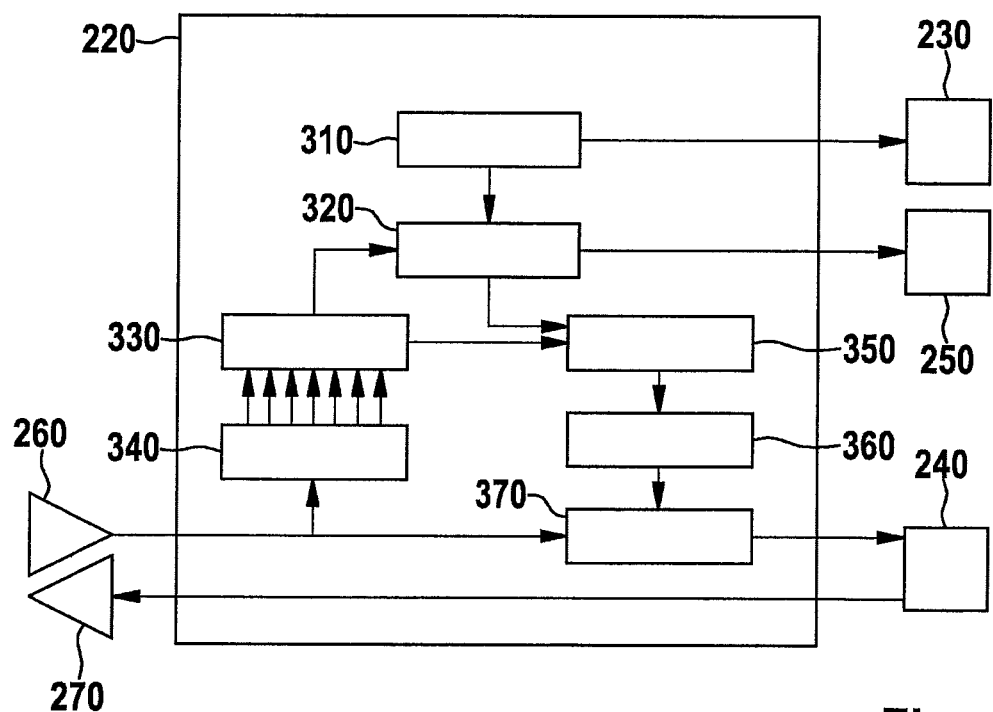
FIG. 4 shows a second exemplary embodiment of the wake-up message memory, which is an essential element of the present invention.

FIG. 4 represents a further exemplary embodiment for the schematic configuration of wake-up unit 220. In this case, no direct access takes place of the application controller to wake-up information storage area 350 via interface 230, but the wake-up information stored there is serialized again by a coding unit 360 arranged for this, and is transmitted serially via changeover switch 370 and interface unit 240 to the communication controller, or rather its RxD input. The communication controller, or rather its RxD input passes on the information included, processed as usual, to the application controller. Thus, in this case, the application controller receives the wake-up information stored in wake-up information storage area 350, after the wake-up process has taken place, in a delayed manner, as a usual message via the communication controller, whereby the additional expenditure for arranging the direct access of the application controller to wake-up information storage area 350, which is necessary in the exemplary embodiment of FIG. 3, is able to be omitted. In return for that, in the example in FIG. 3, the wake-up information is, as a rule, more quickly available to the application controller than is the case in the exemplary embodiment of FIG. 4. With this as background, the two possibilities should be weighed against each other.

What is claimed is:

1. A device for connecting a user station to a CAN bus, comprising:
an arrangement to connect the user station to the CAN bus, the user station in the active state being able to exchange messages with other user stations via the CAN bus according to the standard ISO 11898, the user station in the at-rest state being activatable, using the arrangement, upon reception of wake-up information, the wake-up information being configured as a CAN message according to the standard ISO 11898;
an evaluating arrangement, wherein:
the device is configured to serially receive the wake-up information and store the serially received wake-up information in a first message storage area in the evaluating arrangement and
the evaluating arrangement is configured to evaluate selectively the serially received wake-up information stored in the first message storage area by comparing the serially received wake-up information stored in the first message storage area to one or more predetermined messages, so that a wake-up process is initiated only in the presence of a post-evaluation wake-up information that is specified or specifiable for the respective user station, the presence being determined based on the comparison; and
a second message storage area, wherein the device is configured to, in response to the presence being determined, store in the second message storage area at least a portion of the wake-up information.

2. The device of claim 1, further comprising:
a further arrangement to activate at least one of different application controllers and different functions of at least one application controller as a function of the wake-up information stored in the second message storage area.

3. The device of claim 2, wherein the further arrangement is configured so that read access to the at least the portion of the wake-up information stored in the second message storage area is made available to at least one application controller of the user station.

4. The device of claim 2, wherein the further arrangement is configured so that the at least the portion of the wake-up information stored in the second message storage area is suppliable to a communication controller.

5. The device of claim 4, wherein the further arrangement includes at least one coder to convert the at least the portion of the wake-up information stored in the second message storage area to a serial input signal for the communication controller.

6. The device of claim 5, wherein the further arrangement includes at least one changeover switch to switch over the input signal for the communication controller between the signal present on the bus and the serial signal generated by the coder.

7. The device of claim 1, wherein the evaluating arrangement includes at least one decoder unit configured to decode the serially received wake-up information to produce a decoded version that is then stored in the first message storage area, one filtering memory unit storing the one or more predetermined messages, and a comparator unit configured to perform the comparison.

8. A method for waking up a user station on a CAN bus, the method comprising:
serially receiving wake-up information, the user station in the active state being able to exchange messages with other user stations via the CAN bus according to the standard ISO 11898, the user station in the at-rest state being activatable in response to the reception of the wake-up information, the wake-up information being configured as a CAN message according to the standard ISO 11898;
storing the serially received wake-up information in a first message storage area;
selectively evaluating the serially received wake-up information stored in the first message storage area by comparing the serially received wake-up information stored in the first message storage area to one or more predetermined messages, so that a wake-up process is initiated only in the presence of a post-evaluation wake-up information that is specified or specifiable for the respective user station, the presence being determined based on the comparison; and
in response to the presence being determined, storing in a second message storage area at least a portion of the wake-up information.

9. The method of claim 8, wherein at least one of different sub-functionalities of the user station, different application controllers, and different operating modes of the at least one application controller are activated as a function of the wake-up information stored in the second message storage area.

10. The method of claim 9, wherein read access to the at least the portion of the wake-up information stored in the second message storage area is made available to at least one application controller of the user station.

11. The method of claim 9, wherein the at least the portion of the wake-up information stored in the second message storage area is suppliable to a communication controller.

12. The method of claim 11, wherein the wake-up information is supplied to the communication controller using at least one coder for converting the at least the portion of the wake-up information stored in the second message storage area to a serial input signal for the communication controller.

13. The method of claim 12, wherein the at least the portion of the wake-up information stored in the second message storage area is supplied to the communication controller using at least one changeover switch for switching over the input signal for the communication controller between the signal present on the bus and the serial signal generated by the coder.

14. The method of claim 8, wherein the serially received wake-up information is decoded by at least one decoder to produce a decoded version that is then stored in the first message storage area, a filtering storage unit stores the one or more predetermined messages, and a comparator unit performs the comparison.

15. The method of claim 8, wherein a subsequently received wake-up information is stored in the first message storage area and is selectively evaluated while the at least the portion of the wake-up information that is specified or specifiable for the respective user station is stored in the second message storage area.

16. The device of claim 1, wherein a subsequently received wake-up information is stored in the first message storage area and evaluated selectively by the evaluating arrangement while the at least the portion of the wake-up information that is specified or specifiable for the respective user station is stored in the second message storage area.

17. A device for controlling wake and low power states of a plurality of user stations to a CAN bus, comprising:
an interface to the CAN bus;
one or more interfaces to the plurality of user stations;
a first message storage area;
a second message storage area;
a permanent storage area in which one or more predetermined wake-up messages are stored;
a decoder that is configured to decode a message received serially from the CAN bus via the interface and store a decoded version of the message in the first message storage area; and processing circuitry that is configured to compare the decoded version of the received message, as stored in the first message storage area, to the one or more predetermined wake-up messages stored in the permanent storage area, and, conditional upon a result of the comparison being that a match is found between the received message and at least one of the one or more predetermined wake-up messages, store at least a portion of the received message in the second message storage area, wherein the plurality of user stations are provided access via the one or more interfaces to the second message storage area to each determine from the received message stored in the second message storage area whether the respective user station is to remain in a wake state.

18. The device of claim 17, further comprising a coder to convert the at least the portion of the received message that had been decoded by the decoder back into a serial version that is provided by the one or more interfaces to the plurality of user stations.

19. The device of claim 18, wherein the one or more interfaces includes an interface to a communications controller.

20. The device of claim 17, wherein the at least the portion of the received message includes an entirety of the received message.

* * * * *